United States Patent
Ramachandran et al.

(10) Patent No.: US 8,972,525 B1
(45) Date of Patent: Mar. 3, 2015

(54) SELECTING AN INTERACTIVE CONTENT ITEM BASED ON DEVICE AGE

(75) Inventors: Vinod Kumar Ramachandran, Sunnyvale, CA (US); Nareshkumar Rajkumar, San Jose, CA (US)

(73) Assignee: Google Inc., Mountain View, CA (US)

( * ) Notice: Subject to any disclaimer, the term of this patent is extended or adjusted under 35 U.S.C. 154(b) by 302 days.

(21) Appl. No.: 13/531,091

(22) Filed: Jun. 22, 2012

(51) Int. Cl.
*G06F 15/16* (2006.01)
*H04L 29/08* (2006.01)

(52) U.S. Cl.
CPC ..................................... *H04L 67/10* (2013.01)
USPC .............................. 709/217; 709/222; 709/224

(58) Field of Classification Search
None
See application file for complete search history.

(56) References Cited

U.S. PATENT DOCUMENTS

| | | | |
|---|---|---|---|
| 6,859,807 B1 * | 2/2005 | Knight et al. | 1/1 |
| 7,114,170 B2 * | 9/2006 | Harris et al. | 725/34 |
| 8,571,936 B2 * | 10/2013 | Geer et al. | 705/14.61 |
| 2012/0221674 A1 * | 8/2012 | Ritter et al. | 709/217 |
| 2013/0016629 A1 * | 1/2013 | Mallik et al. | 370/255 |
| 2013/0249948 A1 * | 9/2013 | Reitan | 345/633 |

* cited by examiner

*Primary Examiner* — Mohamed Ibrahim
(74) *Attorney, Agent, or Firm* — Fish & Richardson P.C.

(57) ABSTRACT

Method and apparatus for selecting an interactive content item based on an age of a network accessible device. In accordance with some embodiments, a signal is received from a network accessible device. An age of the device is determined responsive to the received signal. An interactive content item is selected responsive to the determined age, and the selected interactive content item is presented to the network accessible device.

17 Claims, 4 Drawing Sheets

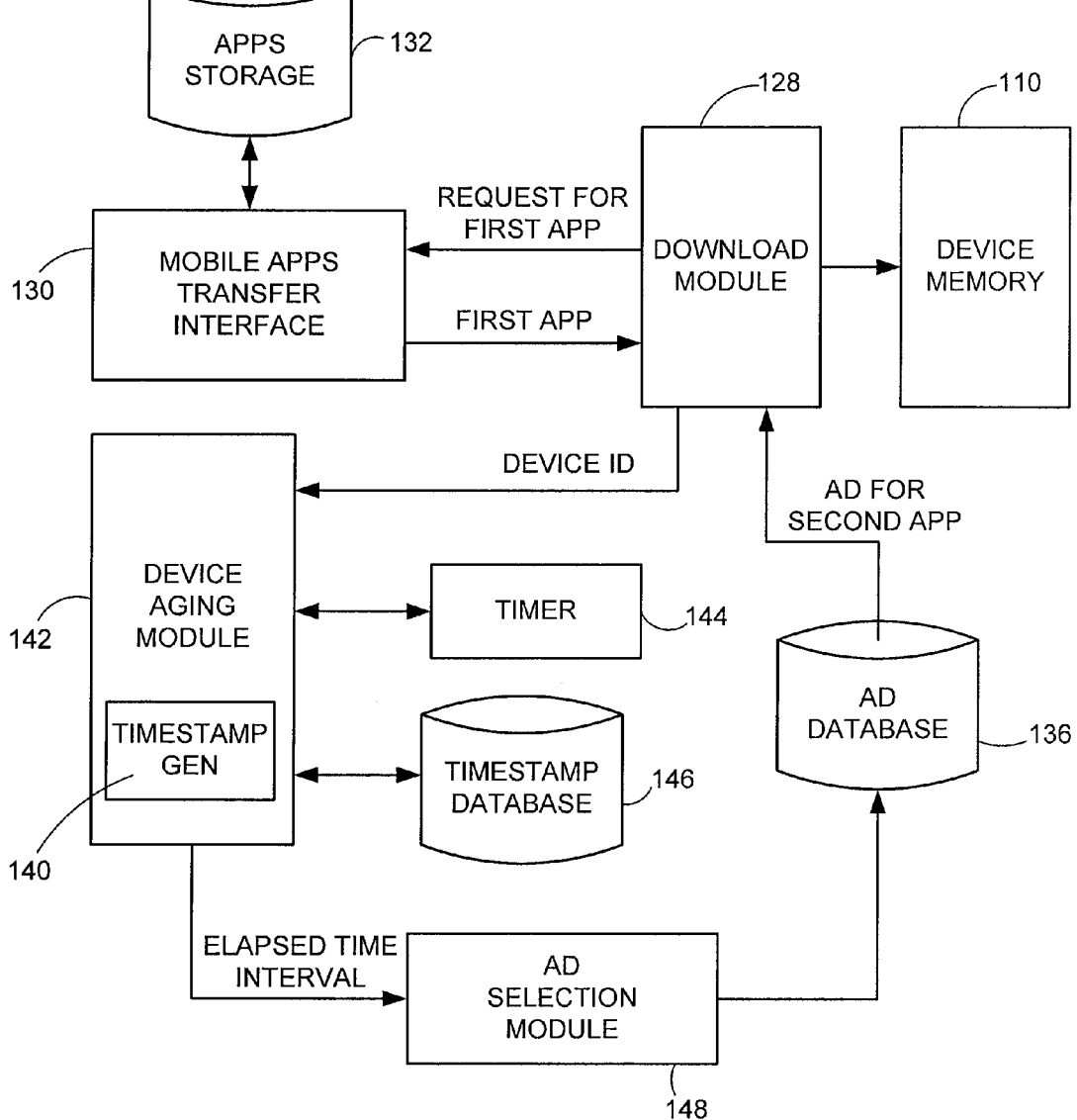

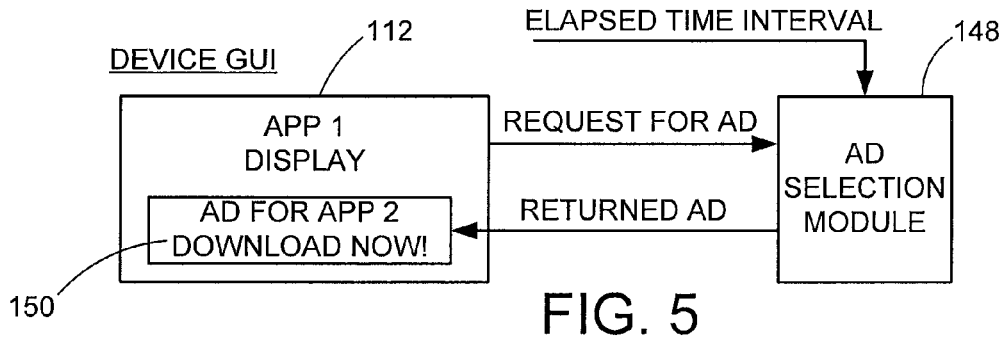
FIG. 5
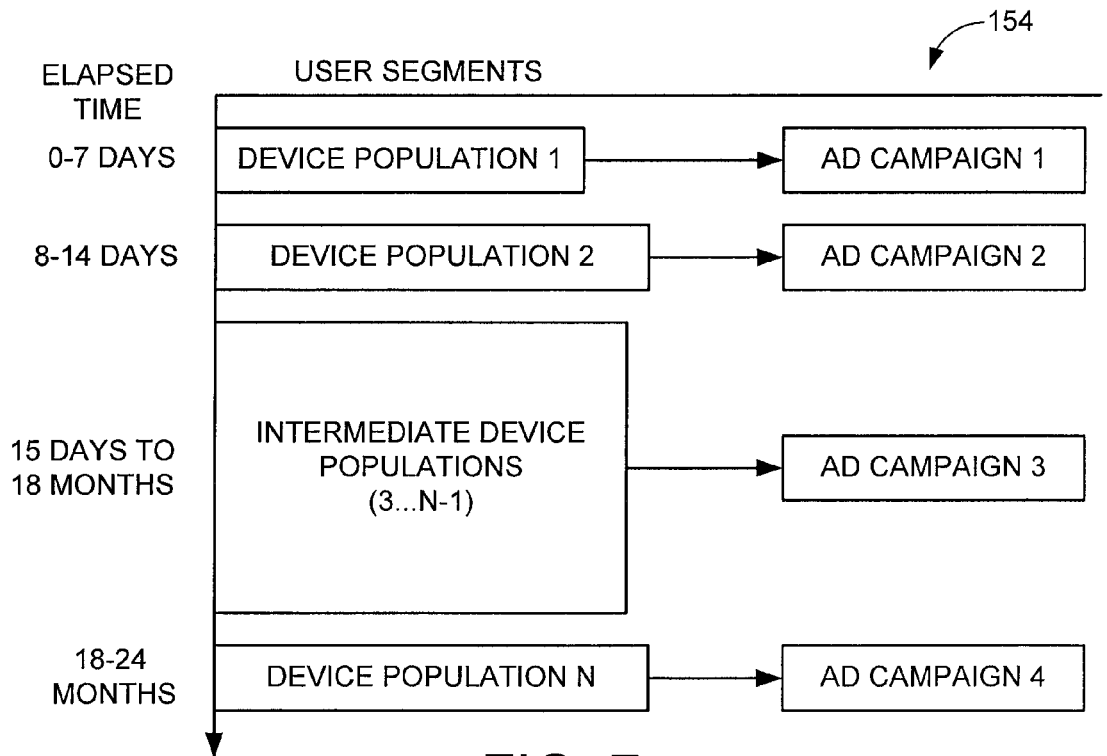
FIG. 6
FIG. 7

SELECTING AN INTERACTIVE CONTENT ITEM BASED ON DEVICE AGE

BACKGROUND

The present disclosure generally relates to the management of mobile applications and mobile advertisements for a network accessible device and the selection of an interactive content item, such as an advertisement or other sponsored content, based on the age of the network accessible device.

Advertisers provide advertisements in different forms in order to attract customers. An advertisement ("ad") is a piece of information designed to be used in whole or in part by a user, for example, a consumer. Ads can be provided in electronic form. For example, online ads can be provided as banner ads on a web page, as ads presented with search results, or as ads presented in a mobile application.

Mobile applications ("mobile apps") are a class of software routines executable on various types of portable network accessible devices such as smart phones, tablets, netbooks, PDAs, etc. Some mobile applications, often referred to as native applications ("native apps"), are pre-installed on mobile devices prior to purchase. Other mobile apps are selectively downloadable by a user, allowing the user to customize the device based on personal preferences. Mobile apps can take a variety of forms such as games, communication programs, daily planners, ebook readers, geopositioning trackers, alert systems, etc.

Mobile apps are often created by developers and offered for download through an online source such as an "app store." Developers may offer mobile apps for free or for a nominal amount, and rely on other mechanisms such as embedded advertising (e.g., "mobile ads") to generate revenue to cover the cost of the mobile app development.

Advertising campaigns may be cost-per-click based (i.e., the advertiser pays for the click). An advertiser looks for ways to maximize the conversion rate (i.e., percentage of users downloading the app after they click on the ad), so that the advertiser may get the maximum return on their investment. Accordingly, a need exists to improve both the click-through rate and the conversion rates for advertising campaigns.

SUMMARY

Various embodiments disclosed herein are generally directed to selecting an interactive content item based on an age of a network accessible device.

In accordance with some embodiments, a signal is received from a network accessible device. In one embodiment, the signal is a request to download a mobile application. In another embodiment, the signal is a request for an interactive content item. An age of the device is determined responsive to the received signal. An interactive content item is selected responsive to the determined age, and the selected interactive content item is presented to the network accessible device. In one embodiment, the interactive content item is an advertisement. The age of the network accessible device is determined based on an elapsed time interval since a first occurrence of a communication between the network accessible device and a server. In other embodiments, a timestamp responsive to a previous communication between the network accessible device and a server is generated. The age of the device in relation to the timestamp is determined.

In accordance with some embodiments, a first application is transferred to a selected network accessible device. A timestamp associated with the transfer is generated. A request for an interactive contact item from the selected network accessible device is subsequently received. An age of the selected network accessible device based on the timestamp is determined. An interactive content item is selected from a population of available interactive content items based on the determined age of the selected network accessible device. The selected interactive content item is transferred to the determined age of the device.

In accordance with some embodiments, the age of the network accessible device is determined based on an elapsed time internal since the transfer of the first application to the network accessible device. In some embodiments, the age of the network accessible device is determined by date of purchase of the network accessible device by a user. In one embodiment, the interactive content item is an advertisement. In some embodiments, the timestamp associated with the age of the selected network accessible device is stored in a memory. In one embodiment, a population of network accessible devices is segmented into elapsed time interval populations based on the age of each network accessible device. In some embodiments, at least one advertising campaign is tailored to at least one elapsed time interval population of network accessible devices.

In accordance with some embodiments, a system includes a mobile application manager adapted to transfer, via a network, an application to a memory of a network accessible device, an application manager adapted to generate a timestamp corresponding to the transfer of the application; and a content manager adapted to transfer, via a network, an interactive content item to a memory of the network accessible device, the content manager selecting the interactive content item from a database of the items based on an age of the network accessible device determined from the timestamp. In some embodiments, the interactive content item is a mobile advertisement for display in conjunction with a mobile application. The application manager is embodied in a first server, the content manager is embodied in a second server, and the first and second servers are connected to the network accessible device via the network. The first server generates the timestamp as an encrypted string responsive to control information received from the interactive network device, and in which the first server transfers the time stamp in conjunction with a request for the interactive content item to the second server. The content manager identifies an elapsed time interval between the transfer of the application to the network accessible device and a request for the interactive content item indicative of the age of the device, wherein different interactive content items are supplied responsive to different ages of the device.

In accordance with some embodiments, a computer-readable storage medium stores associated programming code to transfer a first application to a selected network accessible device, generate a timestamp associated with the transfer, receive a request for an interactive content item from the selected network accessible device, determine an age of the selected network accessible device based on the timestamp, select an interactive content item from a population of available interactive content items based on the determined age of the selected network accessible device; and transfer the selected interactive content item to the determined age of the device. In some embodiments, the interactive content item is an advertisement.

These and other features and advantages which may characterize various embodiments can be understood in view of the following detailed discussion and the accompanying drawings.

BRIEF DESCRIPTION OF THE DRAWINGS

FIG. 3 provides a functional block representation of a timestamp generator.

FIG. 4 is a functional block representation of operations that may be carried out when requesting an advertisement in accordance with various embodiments.

FIG. 5 is a display generated during the request for the advertisement of FIG. 4.

FIG. 6 is a sample log format of cached data.

FIG. 7 illustrates a representation of different user segments based on various time periods.

DETAILED DESCRIPTION

Figure 1:
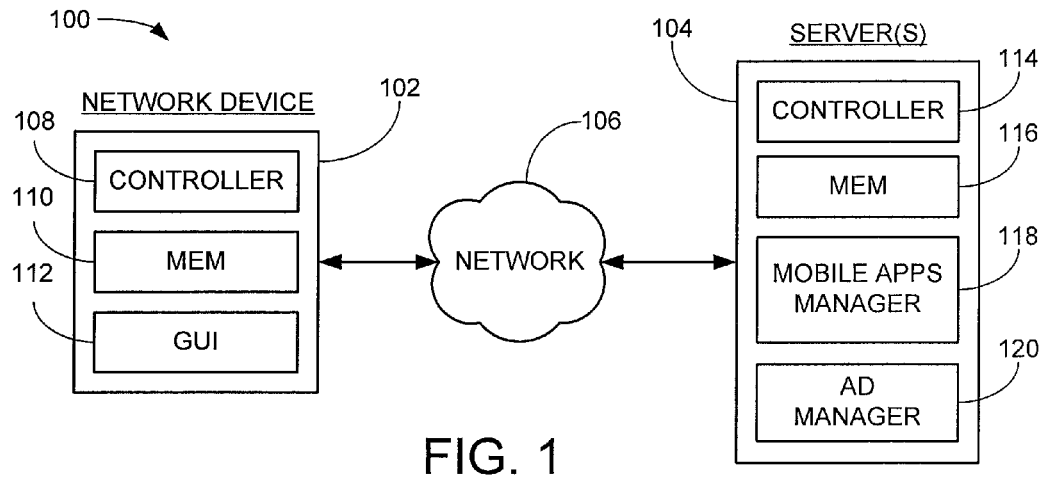
FIG. 1 provides a functional block representation of a network-based system in accordance with various embodiments.

The present disclosure generally relates to the management of interactive content items, and more particularly, for selecting interactive content items for display on_a network accessible device based upon the age of the network accessible device.

It is becoming increasingly common to display interactive content items, such as advertisements or other sponsored content, within the context of a currently executing mobile app. Configuring an application to accept such items may lead to increased revenue opportunities for the developer of the app.

Some mobile ads include a creative portion which may involve text, graphics, images or video files associated with the advertised service and/or product. Mobile ads displayed in mobile applications may offer an upgrade to the existing mobile app, or may offer other mobile apps that are available from the developer. In addition, the mobile ads may be for third party mobile applications, products or services not directly associated with the developer of the mobile app.

Mobile ads may further have an interactive portion such that user selection (a "click") of the advertisement will direct the user to additional information related to the advertisement. The interactive portion of an ad can take a variety of forms. For example, advertisements can be configured such that, upon selection, the user is connected to a linked web page with additional information, often referred to as a "landing page." Some advertisements may have forms or fields to "pre-load" searches or other operations on the landing page associated with the ad.

Other advertisements may have a "click to call" feature that enables a user to call (establish a telephonic connection with) the advertiser directly from the ad, via clicking on a virtual button. Still other advertisements may have a "click to chat" feature that opens a chat window directly from a virtual link or button on the advertisement which enables the user to chat with a representative associated with the ad.

A "click to buy" feature allows users to carry out a purchase transaction for an advertised product or service. Similarly, a "click to download" feature can initiate a transaction that takes the user to an app store to purchase the advertised app.

It is becoming increasingly desirable for advertisers to limit their ads to users likely to make use of that advertiser's products and/or services. One way to limit the scope of advertising is to limit the advertisements, based upon the age of a network accessible device.

Accordingly, various embodiments of the present disclosure are generally directed to a system and method for selecting interactive content items for display on a network accessible device in relation to the determined age of the device. As explained below, when a content manager receives a request to supply an interactive content item such as a mobile ad, the content manager selects an appropriate item based on where the device is with regard to its operational life cycle. The age may be determined by an elapsed time interval since a previous communication with the network accessible device (e.g., the first application downloaded to the device, etc.). In some embodiments, a timestamp is generated at the time of a first communication with the device, and the age is thereafter determined in relation to the elapsed time since the generation of that timestamp.

In this way, different interactive content items (e.g., ads) can be supplied at different times during the life cycle of the device. It has been determined, for example, that relatively new users of devices, such as during the first seven (7) days or the first fourteen days (14) after device activation, may be more likely to download various types of content, such as certain types of games and other mobile apps, than users of older devices. Advertisers may be willing to pay a premium for advertisements provided to such devices. Similarly, the user of a device that has been in service over an extended period of time, such as from around 18-24 months, may be in the market for a new device and/or a new network service provider. Tailoring the ads (or other interactive content items) to the life cycle of the device may accordingly result in greater likelihood of user response.

These and other features and benefits can be understood beginning with a review of FIG. 1 which depicts a network-based, dynamic content transfer system 100 constructed and operated in accordance with various embodiments. The system 100 includes a number of components including a mobile network accessible device 102 and one or more servers 104. The device 102 and server(s) 104 communicate over a network 106, such as a wide area network (WAN), a local area network (LAN), a broadband wireless network, etc.

The network accessible device 102 can take a variety of forms, including, but not limited to a laptop computer, a tablet, a smart phone, a game console, or some other portable network accessible appliance adapted to download and execute applications. The device 102 is shown to include a controller 108, local memory (mem) 110 and a graphical user interface (GUI) 112. Other components may be incorporated into the device.

The controller 108 may be a hardware-based or programmable processor which provides top level control of the device responsive to inputs supplied by a user of the device via the GUI 112. The device memory 110 stores information input by the user, programming and/or control information utilized by the controller 108, and information transferred to the device over the network 106.

The GUI 112 may include a keyboard, keypad, mouse, monitor, touch screen, touch pad, microphone, game controller, and/or other suitable components to enable human comprehensible interaction with and/or control of the device. It is contemplated, although not necessarily required, that the execution of a downloaded mobile app from the memory 110 can be executed by user interaction with the GUI 112, and the resulting execution of the mobile app will display interactive A/V content on the GUI 112.

The server 104 can take a variety of forms, and is shown in FIG. 1 to include a controller 114, server memory (mem) 116, an application manager (e.g., a mobile apps manager) 118 and a content manager (e.g., an ad manager) 120. It will be appreciated that the managers 118, 120 may be realized in hardware, software and/or firmware, and may reside on the same server, or on distinct servers, each having associated controllers and memory spaces to facilitate intercommunication via the network 106. Thus, while only a single network accessible device 102 and a single server 104 are shown in FIG. 1, it will be appreciated that any number of respective devices and servers can be interconnected and utilized in accordance with the present disclosure.

As explained below, a user of the device 102 can access the server(s) 104 to download a mobile app from the mobile apps manager 118 to local device memory 110. During subsequent execution of the mobile app, the ad manager 120 may supply one or more mobile ads (or other interactive content items) responsive to requests for such by the mobile app.

Figure 2:
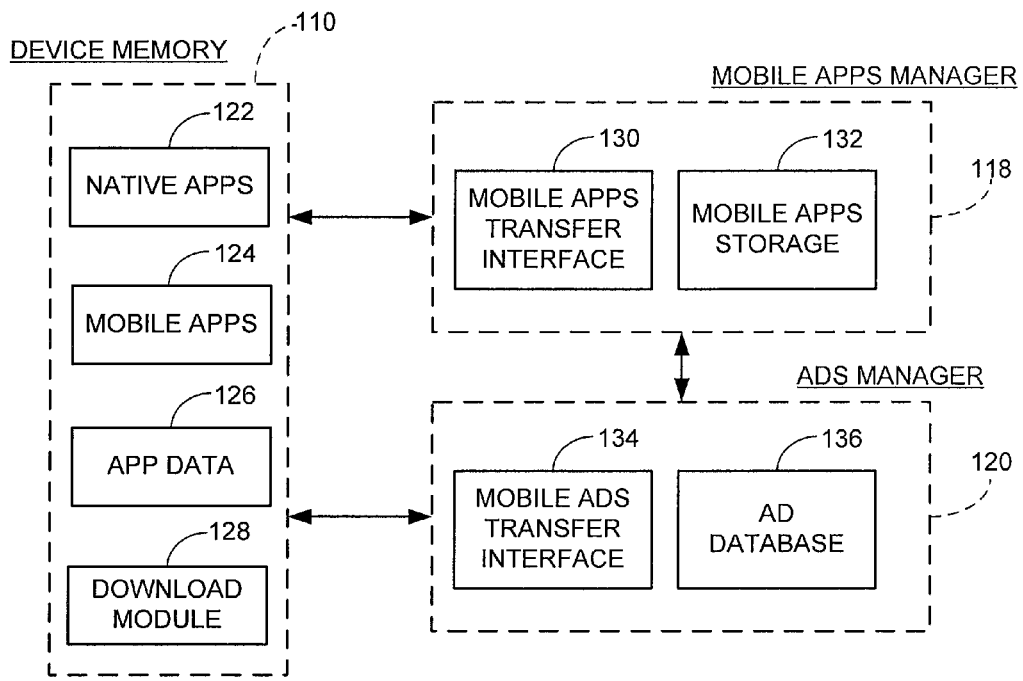
FIG. 2 shows aspects of the system of FIG. 1 in accordance with some embodiments.

FIG. 2 illustrates aspects of the system 100 of FIG. 1 in accordance with some embodiments. The device memory 110 may be a contiguous memory space or made up by a single memory device such as a solid-state memory array or a disc-based memory. Alternatively, the device memory may represent various memory devices within the mobile device 102, including such elements as main memory, a hierarchical cache, I/O data buffers, and local processor (L1-L3) cache. The memory 110 may be volatile, non-volatile, or a combination of both. The memory stores various operational modules including native applications (apps) 122, user downloaded mobile apps 124, application (app) data 126, and a download module 128. Other programming layers, such as a device operating system, may also be provided, as desired.

The native apps 122 will vary, depending on the configuration of the device 100, and generally represent software routines loaded onto and supplied with the device by the manufacturer. In some embodiments, the native apps 122 may include routines such as web browsers (e.g., Safari, etc.), telephone communication routines, video/still camera software, weather alert routines, word processing applications, clock and timing utilities, calculator displays, interface links to app stores, and so on.

The mobile apps 124 represent software routines specifically downloaded by the user for use on the device 102. The mobile apps 124 can take a variety of forms including games, communication programs (e.g., third party email, chat and texting systems, etc.), daily planners, ebook readers, geopositioning trackers, alert systems, and so on. Both the native apps 122 and the user downloaded apps 124 may be represented on the GUI 112 (FIG. 1) as icons that are individually selectable by the user, as desired.

The app data 126 represents a portion of the local memory 110 allocated for the storage of control data associated with the respective execution of the native and downloaded mobile apps 122 and 124, respectively. Segregated data areas may be provided for these respective types of apps; for example, separate caches, history and cookie areas may be maintained for the various apps, both by type (native v. user) and on an individual app basis. Device level data, such as a unique device identification values (e.g., a "device ID") may also be stored in the app data 126. Depending on device configuration, the user may or may not have direct access to the app data stored in the app data 126, and may or may not be able to delete, alter or overwrite data stored therein.

The download module 128 may be a stand-alone module, or may be incorporated as a portion of one or more of the mobile apps 124. In some embodiments, the download module 128 may form a portion of the software development kit (SDK) functionality of the mobile apps 124 that are configured in accordance with the present disclosure. In some embodiments, the download module 128 operates to locally store data indicative of the user's intent to take action, to detect the user's termination of the mobile app in which the intent was expressed, and to automatically initiate the intended action such as by contacting an appropriate remote site, via the network 106 (FIG. 1) to commence a desired data exchange.

The mobile apps manager 118 is shown in FIG. 2 to include a mobile apps transfer interface block 130 and a mobile apps storage space 132. Other modules can readily be incorporated. The mobile apps transfer interface block 130 generally operates to facilitate data transfers with the device 102, including the downloading of requested mobile apps from the storage space 132 and the servicing of requests for data from the device 102 associated with the execution of the mobile apps. The mobile apps storage space 132 represents a storage area for a number of different mobile apps available for download to the device, such as through an application provider ("app store"). The mobile apps storage space 132 may be provided via a cloud computing and storage system and may interface with a variety of third party suppliers of applications to provide the various available mobile apps.

The ad manager 120 includes a mobile ads transfer interface block 134 and a mobile ad database 136. The ad manager 120 generally operates to receive requests for mobile ads and, in response thereto, proceeds to select and transfer one or more appropriate ads from the mobile ad database 136 for display on the local device 102. As before, the ad manager 120 may incorporate a number of additional modules, including cloud computing and storage capabilities.

For purposes of providing a concrete example, it is contemplated in FIG. 2 that a selected mobile ad, referred to herein as "app 1," has been selected for download by the user of the device 102 to the mobile apps 124. The selection process may be a result of the user responding to a mobile ad presented in another, previously downloaded mobile app, or through some other mechanism such as through one of the native apps. For example, the user may have requested the download by accessing a link in the native apps to a particular app store associated with the mobile apps manager 118 or an ad associated with the ad manager 120. The successful download of the app 1 mobile app results in the display of an associated icon on the GUI 112 of the local device 102.

The device 102 is provided with a device identifier which is outputted to the server 104 when an app or ad download is requested by the device 102. The device identifier can take a variety of forms and can be, for example, a unique alphanumeric identifier associated with the device 102 (or an identifier derived from the device identifier to protect user privacy), a username (or other user identifier) of the user of the device 102, etc.

As depicted in FIG. 3, a timestamp generator 140 may operate to generate a timestamp value in response to a communication between the network accessible device 102 and a selected server 104. In some embodiments, the timestamp is generated by the application manager 118 in response to a request to download a first mobile application to the device. The timestamp can take a variety of forms and is based on the time of the first occurrence that an ad or app is requested from the server 104. Alternatively, the timestamp is generated, based on the actual date of purchase of the device 102.

It should be noted that while FIG. 3 shows the timestamp to be generated based on a device identifier, such is merely by way of example and is not limiting, as any type of control data associated with the device 102 can be used. For example, a hash function can be applied to a device identifier, the device identifier can be an anonymous identifier derived from an actual device identifier, an encrypted version of the device identifier, an IP address associated with the device, and so on, so long as the value can be reasonably used to distinguish the device from other devices and/or users and serves to generally identify a point in time at which a communication has taken place with the device. The user of the device 102 can be provided with an option to opt out of the timestamp generation operation.

In some embodiments, an opt in/opt out feature is incorporated into the system so that, responsive to an expressed desire on the part of a user, profile information is accumulated and stored by the publisher as a result of previous dealings of the user with the publisher site. For example, if the user is a registered user of the publisher's website, certain non-personally identifiable information, such as gender, age, interests, etc., may be voluntarily supplied by the user at the time of the registration and forwarded for use in selecting the appropriate ad. Other profile information may include information supplied by the device, and/or supplied by the ad and/or app server, such as previous links visited by the user prior to requesting the current web page, cookies previously stored on the device, purchase history information associated with the device, etc. Data anonymity is provided for security and privacy reasons.

FIG. 4 provides a functional block representation of various operations of the system of FIGS. 1-3 in accordance with some embodiments. In the example of FIG. 4, the mobile apps transfer interface block 130 of the mobile apps manager 118 receives a signal from the download module 128 to download an application. Although the data signal is shown in FIG. 4 as a request for a first app, it should be understood that the data signal may also be for any type of communication, including but not limited to a request for an interactive content item as discussed herein. Alternatively, the communication may be an activation signal associated with the initial purchase of the device by the user. In the context of a request to download a first app, the mobile apps transfer interface block 130 obtains the requested first app from the apps storage space 132 and provides the first app to the download module 128 to be stored in the device memory 110.

The device identifier (or other control information) is supplied to a device aging module 142, which incorporates the aforementioned timestamp generator 140 (FIG. 3) and has an associated timer 144 and timestamp database 146.

The timestamp generator 140 generates a timestamp for the device and stores the generated timestamp in the timestamp database 146. The timer 144 is thereafter used to determine an elapsed time interval (e.g., an age value) since the generation of the timestamp. The timer 144 may be configured to calculate desired elapsed time periods for multiple timestamps generated at different times.

As shown in FIGS. 4 and 5, the execution of the downloaded first application ("app 1") results in a display on the GUI 112 of the network accessible device 102. The first app may, at some point, request an ad from an ad selection module 148. The ad selection module 148 will select an appropriate ad based on the request as well as based on the elapsed time interval (e.g., age) of the device 102. A mobile ad for a second app, referred to as "app 2", is provided by the ad selection module 148, and displayed as generally indicated at block 150. User selection of the displayed ad will direct a download of the second application to the device.

FIG. 6 provides a schematic representation of a history log 152 in accordance with some embodiments. The log 152 is shown to accommodate up to N timestamps associated with up to N device requests. The history can subsequently be transferred to the mobile apps manager 118, and the ad manager 120, allowing the effectiveness of various ad campaigns to be evaluated. The history data may enable developers to evaluate the placement, frequency and types of ads that are most effective in the mobile app context.

Various ad campaigns may be created from the elapsed time intervals generated by the systems of FIGS. 4-5. FIG. 7 illustrates a representation of ad campaigns which can be created based on different user segments and various time periods. For example, ad campaign 1 selects advertisements that are relevant to a device population 1, having an elapsed time period of 0-7 days. This first population represents brand new devices that have been active in communicating with the network for a week or less (so-called "seven day users"). Similarly Ad campaign 2 selects advertisements that are relevant to device population 2, having an elapsed time period of 8-14 days ("fourteen day users"). Ad campaign 3 selects advertisements that are relevant to intermediate device populations (3 ... N−1), having an elapsed time of from 15 days up to 18 months ("intermediate users"). Ad campaign 4 selects advertisements that are relevant to device population N, having an elapsed time of 18-24 months. It should be understood that any ad campaign may be created as discussed herein utilizing any number of devices and factors with any elapsed time frame, based on the first occurrence of the device in the system, or the actual purchase date of the device as described herein.

The different ad campaigns in FIG. 7 can be tailored to these different life cycle portions of the device. For example, the ad selection module may utilize a greater frequency of ads for those devices that are relatively early in the usage life cycle, and may provide ads more directed toward offering downloads of certain types of mobile apps, such as games. Contrawise, the ad selection module may use a different strategy for intermediate users, including strategies based on previous download history and frequency as indicated, for example, by a history table as represented in FIG. 6. The ad selection module may further direct ad campaigns for end of life devices geared more toward new replacement devices and/or new network carrier options. This latter is based on a recognition that many network carrier contracts currently specify a contract period of around two years. Network carriers and device suppliers may be interested in providing special offers to encourage existing customer loyalty and/or to attract new customers.

Figure 8:
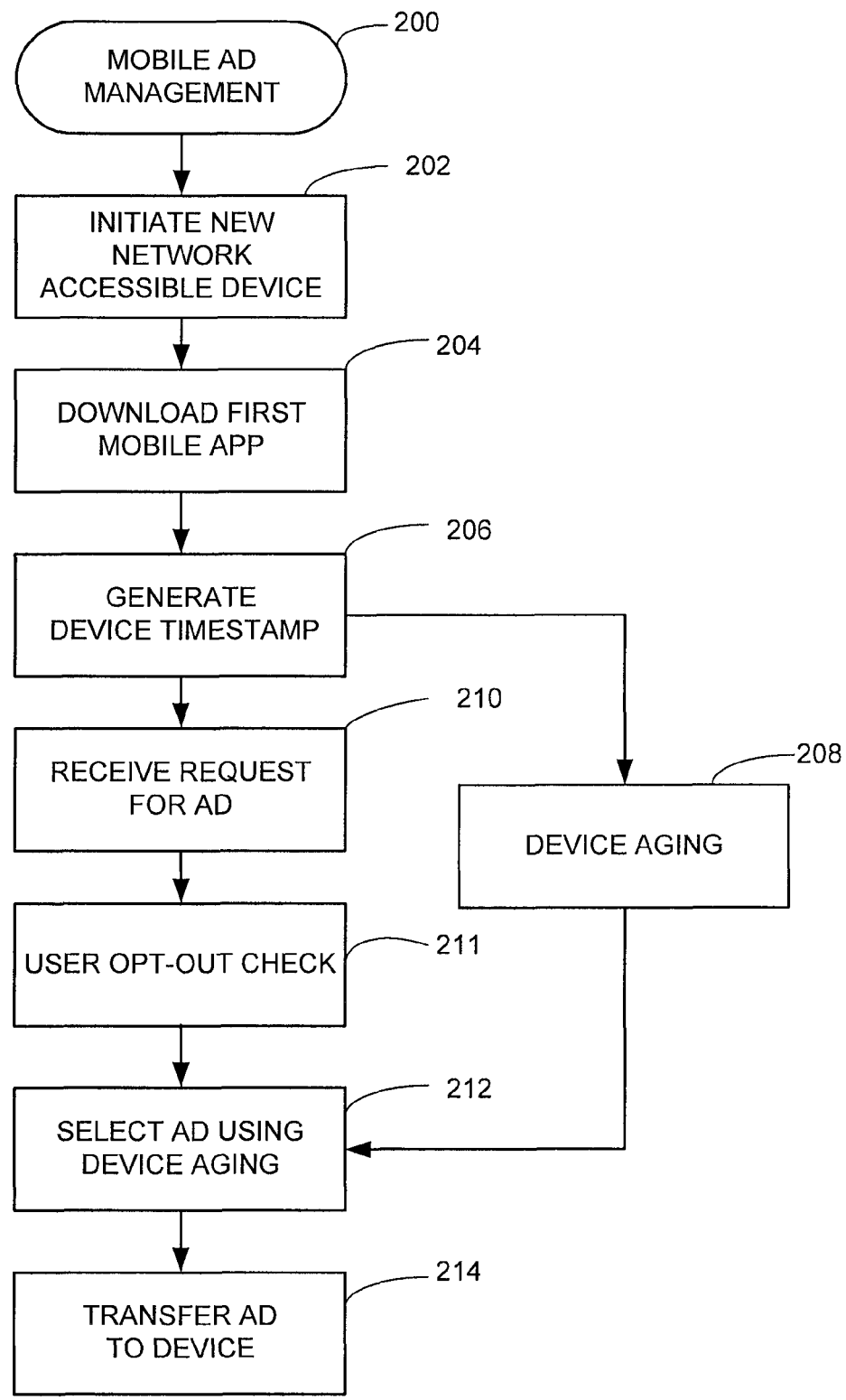
FIG. 8 provides a flow chart for a routine illustrative of steps that may be carried out in accordance with various embodiments.

FIG. 8 provides a flow chart for a mobile ad management routine 200 illustrative of various steps that may be carried out in accordance with the foregoing discussion. The steps may be representative of programming supplied in a mobile ad from a server 104 and downloaded to a network accessible device such as the device 102 in FIGS. 1-2.

At step 202, a new network accessible device 102 is initiated by a user. At step 204, a first mobile app is downloaded to the device 102. At step 206, the timestamp is generated for the device identifier of the device 102. The timestamp being based on the first occurrence of the device 102 associated with the server 104. Alternatively, the timestamp may be based on the actual purchase date of the device 102 by the user.

At step 208, the age of the device 102 is determined. At step 210, the server 104 receives a request for an ad. At step 211, the server 104 checks to determine if the user has opted out of the timestamp generation operation. If the user has opted out, an ad is selected which does not use the age of the device. At step 212, an ad is selected based on the age of the device calculated from step 208. At step 214, an ad is transferred to the device 102.

While the foregoing discussion has contemplated the request communication as an advertisement, such is merely illustrative and not limiting. The interactive content item may take any variety of forms, such as a public service announcement, an advertisement for a political candidate, an opportunity to contribute to a social movement or relief fund, a request to sign a petition or other organized activity, an invitation to comment upon or indicate approval of the first app in a social network, an offer to purchase a physical item such as a book or movie tickets, and so on.

In some embodiments, the subject matter may be incorporated in the form of computer-readable storage media including, but not limited to, an electronic, optical, magnetic, or other storage or transmission device capable of providing a processor with computer-readable instructions. Examples of suitable media include, but are not limited to, a floppy disk, CD-ROM, DVD, magnetic disk, memory chip, ROM, RAM, an ASIC, hard disk drive (HDD), solid-state drive (SSD), flash memory, a configured processor, optical media, magnetic tape or other magnetic media, or any other medium from which a computer processor can read instructions. Also, various other forms of computer-readable media may transmit or carry instructions to a computer, including a router, private or public network, or other transmission device or channel, both wired and wireless. The instructions may comprise programming code from any suitable computer-programming language, including but not limited to, for example, C, C++, C#, Visual Basic, Java, Python, Perl, and JavaScript. It will be appreciated that a computer readable storage medium, as used herein, does not include a transitory signal.

From the above description, it is clear that the present disclosure is well adapted to carry out the objectives and to attain the advantages mentioned herein as well as those inherent in the invention. While presently preferred embodiments of the invention have been described for purposes of this disclosure, it will be understood that numerous changes may be made which will readily suggest themselves to those skilled in the art and which are accomplished within the spirit of the invention disclosed and claimed.

What is claimed is:

1. A computer-implemented method, comprising:
transferring an application to a network accessible device;
generating a timestamp corresponding to a time of the transfer of the application to the network accessible device;
subsequent to transferring the application to the network accessible device, receiving a request for an interactive content item from the network accessible device;
responsive to receiving the request for the interactive content item, determining an age of the network accessible device, wherein the age of the network accessible device is based on an elapsed time interval since the time of the transfer of the application to the network accessible device;
determining a plurality of different time periods, each time period having a respective range of ages, and each time period corresponding to a different strategy for selecting interactive content items;
based on the determined age of the network accessible device, determining a relevant time period for the network accessible device;
selecting an interactive content item from a population of available interactive content items, using a strategy for selecting interactive content items that corresponds to the relevant time period for the network accessible device; and
transferring the selected interactive content item to the network accessible device.

2. The method of claim 1, further comprising:
segmenting a population of network accessible devices into elapsed time interval populations based on the age of each network accessible device.

3. The method of claim 2, further comprising:
tailoring at least one advertising campaign to at least one elapsed time interval population of network accessible devices.

4. The method of claim 1, wherein the interactive content item is an advertisement.

5. The method of claim 1, further comprising:
storing the timestamp corresponding to the time of the transfer of the application to the network accessible device in a memory.

6. A computer-implemented method, comprising:
receiving an initial communication from a network accessible device;
generating and storing a timestamp corresponding to a time of the initial communication from the network accessible device;
subsequent to receiving the initial communication, receiving a request to supply an interactive content item to the network accessible device;
responsive to receiving the request to supply the interactive content item, determining an age of the network accessible device, wherein the age of the network accessible device is based on an elapsed time interval since the time of the initial communication from the network accessible device;
determining a plurality of different time periods, each time period having a respective range of ages, and each time period corresponding to a different strategy for selecting interactive content items;
based on the determined age of the network accessible device, determining a relevant time period for the network accessible device;
selecting an interactive content item, using a strategy for selecting interactive content items that corresponds to the relevant time period for the network accessible device; and
presenting the interactive content item to the network accessible device.

7. The method of claim 6, wherein the initial communication includes a request to download a mobile application.

8. The method of claim 6, wherein the initial communication includes a request for an interactive content item.

9. The method of claim 6, wherein the interactive content item is an advertisement.

10. The computer-implemented method of claim 6, wherein the initial communication includes an activation signal associated with a purchase of the network accessible device.

11. A system, comprising one or more computing devices, the one or more computing devices comprising a mobile application manager, an application manager, and a content manager, in which:
the mobile application manager transfers, via a network, an application to a memory of a network accessible device;
the application manager generates a timestamp corresponding to a time of the transfer of the application to the network accessible device; and the content manager transfers, via a network, an interactive content item to a memory of the network accessible device, the content manager selecting the interactive content item from a database of interactive content items, wherein the selecting is based on:
(i) determining an age of the network accessible device, wherein the age of the network accessible device is based on an elapsed time interval since the time of the transfer of the application to the network accessible device;
(ii) determining a plurality of different time periods, each time period having a respective range of ages, and each time period corresponding to a different strategy for selecting interactive content items;
(iii) based on the determined age of the network accessible device, determining a relevant time period for the network accessible device; and
(iv) using a strategy for selecting interactive content items that corresponds to the relevant time period for the network accessible device.

12. The system of claim 11, in which the interactive content item is a mobile advertisement for display in conjunction with a mobile application.

13. The system of claim 11, in which the application manager is embodied in a first server, the content manager is embodied in a second server, and the first and second servers are connected to the network accessible device via the network.

14. The system of claim 11, in which the first server generates the timestamp as an encrypted string responsive to control information received from the network accessible device, and in which the first server transfers the timestamp in conjunction with a request for the interactive content item to the second server.

15. The system of claim 11, in which the content manager identifies the elapsed time interval since the time of the transfer of the application to the network accessible device and a request for the interactive content item indicative of the age of the network accessible device, wherein different interactive content items are supplied responsive to different ages of the network accessible device.

16. A non-transitory computer-readable storage medium which stores associated programming code to cause one or more computers to perform operations comprising:
transferring an application to a network accessible device;
generating a timestamp corresponding to a time of the transfer of the application to the network accessible device;
subsequent to transferring the application to the network accessible device, receiving a request for an interactive content item from the network accessible device;
responsive to receiving the request for the interactive content item, determining an age of the network accessible device, wherein the age of the network accessible device is based on an elapsed time interval since the time of the transfer of the application to the network accessible device;
determining a plurality of different time periods, each time period having a respective range of ages, and each time period corresponding to a different strategy for selecting interactive content items;
based on the determined age of the network accessible device, determining a relevant time period for the network accessible device;
selecting an interactive content item from a population of available interactive content items, using a strategy for selecting interactive content items that corresponds to the relevant time period for the network accessible device; and
transferring the selected interactive content item to the network accessible device.

17. The non-transitory computer-readable storage medium of claim 16, in which the interactive content item is an advertisement.

* * * * *